United States Patent [19]

Nozawa et al.

[11] 4,389,556
[45] Jun. 21, 1983

[54] METHOD FOR ELECTRIC RESISTANCE SEAM WELDING OF THE SIDE OVERLAPPED PORTION OF A TUBULAR FORM

[75] Inventors: Tetuo Nozawa, Shizuoka; Jun Nagata, Koganei; Michiyuki Kakimoto, Shimizu, all of Japan

[73] Assignee: Daiwa Can Company, Limited, Tokyo, Japan

[21] Appl. No.: 298,526

[22] Filed: Sep. 1, 1981

[30] Foreign Application Priority Data

Sep. 19, 1980 [JP] Japan .................................. 55/130207

[51] Int. Cl.³ .................... B23K 1/16; B23K 11/06; B23K 9/00
[52] U.S. Cl. ................................ 219/64; 219/83; 219/118
[58] Field of Search .................. 219/59.1, 64, 79, 81, 219/83, 61.5, 80, 117.1

[56] References Cited

U.S. PATENT DOCUMENTS 2,187,740 12/1940 Hothersall .......................... 219/64
3,542,992 11/1970 Sennello ............................ 219/81
3,632,949 1/1972 Thorne .............................. 219/64

Primary Examiner—C. C. Shaw
Assistant Examiner—Teresa Walberg
Attorney, Agent, or Firm—Wenderoth, Lind & Ponack

[57] ABSTRACT

A method of forming thin steel plate of predetermined dimensions into a tubular form such as a cylindrical or square tubular form and subjecting the side seam or the overlapped portion of the form to electric resistance seam welding by passing it between upper and lower electrodes, which comprises applying a higher welding current to both edge parts of the overlapped portion than to the other parts or the center of the overlapped portion thereby adjusting a welding current to such a value which does not substantially cause the formation of burrs but provides the center with a desired weld strength.

7 Claims, 9 Drawing Figures

METHOD FOR ELECTRIC RESISTANCE SEAM WELDING OF THE SIDE OVERLAPPED PORTION OF A TUBULAR FORM

BACKGROUND OF THE INVENTION

The present invention relates to an improvement in a method for the seam welding of the side seam or overlapped portion of a tubular form, for example, a cylindrical, square or elliptical tubular form, which is welded to be formed into a can body, using an automatic electric resistance seam welder (hereunder referred to only as a welder).

Welding using the above type welder is well known, but, to make sure, we will explain it with reference to FIG. 1.

First, pieces of thin metal plate cut to predetermined dimensions are pulled out from their stacking station 1 one by one to make tubular forms surrounding a horizontal supporting arm 2 (in FIG. 1 one of them is shown as a cylindrical tubular form A represented by a two-dotted chain line). The tubular forms move along this supporting arm 2 from the left to the right in the drawing. A lower electrode wire guide part 3 is positioned at the right end of the supporting arm. The lower electrode wire guide part 3 consists of a horizontal fixed axle 4 which extends perpendicularly to the horizontal supporting arm 2 and is fixed to arm 2, and a lower electrode wire-supporting roll 5 which is rotatably fitted around said axle 4. Just above the lower electrode wire guide part 3, there is positioned an upper electrode wire guide part 12 which comprises a horizontal revolving axle 11 which is parallel to the horizontal fixed axle 4 and an upper electrode wire-supporting roll 10 which is fitted over axle 11 and revolves together with axis 11. A lower electrode wire 6 runs along the underside of the horizontal supporting arm 2 from the left to the right in the drawing to go around the circumferential surface of the supporting roll 5 and then goes back to the left in the drawing again along the underside of the supporting arm 2. An upper electrode wire 14 runs along a guide roll 13 and the circumferential surface of the upper electrode wire-supporting roll 10 and goes back to the left in the drawing. The upper electrode wire 14 is moved in the same direction as said roll 13 and in a counterclockwise manner by supporting roll 10, whereas the lower electrode wire 6 is moved by being coiled round a reel (not shown), and the lower electrode wire-supporting roll 5 is revolved in a clockwise manner by such movement.

Each of the above tubular forms has an overlapped portion 20 which is formed by the two edge portions of a piece of thin metal plate and moves with said overlapped portion 20 being at the top. The overlapped portion is inserted between the upper and the lower electrode wires 14 and 6. Push pressure is applied downwards to the upper electrode wire guide part 12, so that overlapped portion 20 is pressed between the two electrode wires. Thus, the overlapped portion moves as the two electrode wires progress. During this movement welding current passes through the upper electrode wire guide part 12, the upper electrode wire 14, the overlapped portion of a tubular form 20, the lower electrode wire 6 and the lower electrode wire guide part 3. The overlapped portion is melted and subjected to pressure welding as the facing surfaces of the overlapped portion of a piece of thin metal plate and its vicinity is heated by the contact resistance of the facing surfaces. Thus, the overlapped portion is subjected to what is called electric resistance seam welding.

In this case, as is shown in FIG. 1, a preceding cylindrical tubular form $A_1$ is in a position just before its release from the contact with the upper and the lower electrode wires 14 and 6, the directly following cylindrical tubular form $A_2$ is in a position to have just entered the contact with the upper and the lower electrode wires, and thus both the rear end 21 of the preceding cylindrical tubular form and the front end 22 of the following cylindrical tubular form are located between the upper and the lower electrode wires. If the following cylindrical tubular form is inserted between the upper and the lower electrode wires after the preceding cylindrical tubular form has completely passed through between the wires, a higher push pressure is applied to the edge part of the overlapped portion of each of the tubular forms, and, as is shown in FIG. 2, projections 25 and 26 which run from the cylindrical tubular form and extend longitudinally along the overlapped portion 20 are formed at the edges of the overlapped portion 20. Therefore, the above position shown in FIG. 1 is a countermeasure to prevent this formation.

Can bodies have already been manufactured by subjecting the overlapped portions of cylindrical tubular forms made of thin tinplate having a thickness of 0.2-0.4 mm to seam welding according to the above-mentioned method. In the process of producing can bodies, the current supplied to portions to be welded changes within a certain range during the continuous manufacture over a long period of time, depending on the change of the appliances in temperature and so on. When the welding is made by setting the current at such a value that both edge parts of the overlapped portion with a predetermined weld strength can be prepared by even the minimum current within the range of fluctuation, a can body A welded when the current has increased to a higher value within the above range of fluctuation under continuous manufacture over a long period of time, has projections 25 and 26 which run from both edges 23 and 24 of the can body $A_0$ and are on the extension line of the overlapped portion 20 as is shown in FIG. 2. Such projections 25 and 26 are undesirable because they become a cause of damage to the seal between a can cover and a can body unless they are extremely small. Such being the case, as a countermeasure to prevent their formation, the welding has been made by applying a lower weld current to both edge parts 27 and 28 of the overlapped portion 20 than to the center 29 or the parts other than the edge parts of the overlapped portion so that projections cannot be formed even if the welding is made using the maximum current within the above range of fluctuation. However, the current applied to both edges parts of the overlapped portion becomes lower than the minimum current value for both edge parts to get a requisite weld strength when the current value decreases to a lower value within the range of fluctuation, and in this case the resulting weld strength of both edges parts is poor, and does not match the predetermined strength. Can bodies which have both edge parts of weld strength lower than the predetermined strength suffer from separation or breakage (hereunder referred to as crack) of both edge parts of the overlapped portion when flanges extending radially and outwardly from the can body are formed on both opening end portions of the can body.

Can bodies having these cracks are unacceptable because the seal between such can bodies and the can covers to be seamed on them would be poor.

Then, as a further countermeasure, we, the inventors of the present invention, tried to control the change in supply current manually while watching the change with a current meter thereby controlling the fluctuation within a narrow range and to weld the overlapped portion of each of the tubular forms by current within such narrow range without making the weld current applied to the both edge parts lower than that applied to the center —that is—by the weld current of the same value along the overall length of it. As a result, we have found that, in spite of changing of the value of the current within the narrow range during the continuous production over a long period of time, a satisfactory effect is obtained. That is, no substantial formation of projections extending from both edges of the overlapped portion mentioned above was observed even by the weld using the maximum current within the narrow range, while the minimum current within the range provided both edge parts with satisfactory weld strength and did not cause a crack at the edge parts when the flanges were formed. For this reason, tinplate-made can bodies can now be welded and manufactured according to this method.

We have further tried to subject a chromate-treated steel plate-made cylindrical tubular form to electric resistance seam welding by the utilization of the above welding method. First, when the whole of the overlapped portion was welded with the lowest current which can provide both of the edge parts with the requisite weld strength, as is shown in FIGS. 3 and 4, many short thread-like or hair-shaped solid pieces 32 (hereunder referred to as burrs 32), which seem to be a result of the scattering or extrusion of the softened or melted parts of the overlapped portion, were formed extending outwardly from a longitudinal edge 31 of the inner side of the overlapped portion 20 (the inner face side of the tubular form). These burrs increased in number and size as the supply current became higher. If these burrs 32 are large, they become a bar to the application of a paint for coating the inner surface of the welded overlapped portion. If a paint coating cannot be satifactorily applied, cans comprising such can bodies as have such burrs tend to damage the quality of the contents. Accordingly, the best condition of the can bodies is that they have no burrs. Even if burrs are formed, in order that the can bodies be satisfactory for use, the burrs must be so small that they do not prevent the application of paint and are well coated with the paint (hereunder this condition of the can bodies is referred to as the condition where there is no substantial formation of burrs). Therefore, next, the supply current was lowered to a value which did not cause the formation of burrs but was sufficient to weld the whole of the overlapped portion. As a result, it has been found that the manufactured can bodies comprise a substantial number of can bodies having both of the edge parts insufficient in the weld strength.

Further, we have found that can bodies having no burrs and having the predetermined weld strength can be manufactured if the change in the supply current is substantially nil. However, the equipment necessarily becomes highly expensive in order to make the change in the supply current substantially nil, and thus it is not practical from an industrial viewpoint to so control the supply current.

Surely, there has been suggested a method for the welding where the chrome layer on the overlapped portion has been removed prior to the welding. But, this method also is not practical because in a high speed production line where several hundreds of cans are manufactured per minute it is extremely difficult to effect the removing operation at a high speed, accurately, continuously and over a long period of time, by any known physical and chemical means.

Furthermore, among the prior art methods, the welding method where the current applied to both of the edge parts of the overlapped portion is lower, cannot provide can bodies of good quality even if the can bodies are manufactured by welding steel plate having a chrome coating on the surface.

Accordingly, it is an actual aspect of the art that can bodies are not mass produced by welding steel plate having a chrome-coating such as chrome-treated steel plate.

SUMMARY OF THE INVENTION

An object of the present invention is to provide an electric resistance seam welding method which is applicable to the welding of the overlapped portion of a cylindrical tubular form made of thin steel plate having a chrome-coating on the surface to provide the cylindrical form with welding effects which are preferable as materials for cans.

A further object of the present invention is to provide an electric resistance seam welding method for welding the overlapped portion of a tubular form made of thin steel plate having a chrome-coating on the surface conveniently without the previous removal of the chrome layer.

A further object of the present invention is to provide an electric resistance seam welding method for chrome-treated steel plate which may be applied to high speed production, does not cause a substantial formation of burrs and provides the needed weld strength.

Other objects of the present invention will become apparent from the description given below and the drawings.

According to the present invention, there is provided a method for electric resistance seam welding of the side overlapped portion of a tubular form made of thin steel plate which comprises in turn inserting each of the tubular forms between welding electrodes and subjecting the overlapped portion of the tubular forms to electric resistance seam welding between the electrodes, wherein before the overlapped portion of a preceding tubular form has passed between the electrodes, the overlapped portion of a following tubular form is inserted between the electrodes to subject the overlapped portion to welding, characterized by setting the welding current applied to the center part except for both edge parts of the overlapped portion at a current value A which does not produce a substantial formation of burrs and provides the center part with a desired weld strength, and setting the welding current applied to both edge parts of the overlapped portion at a value B higher than value A.

Here, the thin steel plate may be chrome-treated steel plate, nickel-chrome-treated steel plate or tin-plate.

Also, the tubular form may be any of cylindrical, square and ellipsoidal forms.

In one example of the method, the thin steel plate may be chrome-treated steel plate, and the current of values A and B may be primary current having average values of 47.05 A and 48.25 A, respectively.

In another example of the method, the thin steel plate may be nickel-chrome treated steel plate, and the current of values A and B may be primary current having average values of 59.1 A and 60.35 A, respectively.

DETAILED EXPLANATION OF PREFERRED EMBODIMENTS OF THE INVENTION

Hereunder, examples of the present invention will be explained with reference to the drawings.

EXAMPLE 1

Figure 1:
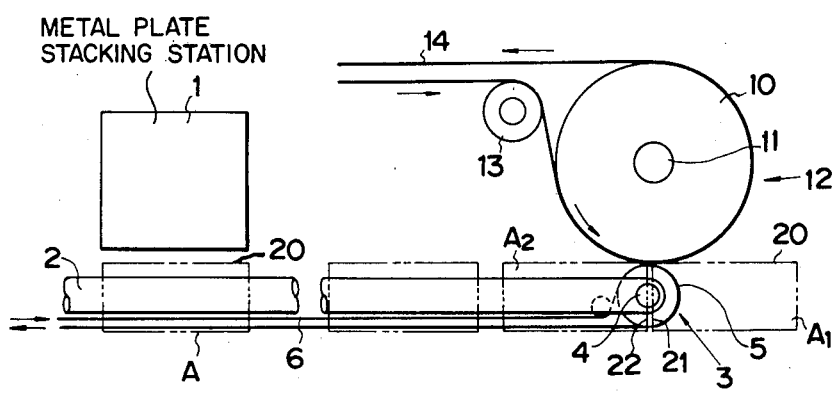
FIG. 1 is a schematic representation of an automatic electric resistance seam welder.
Figure 2:
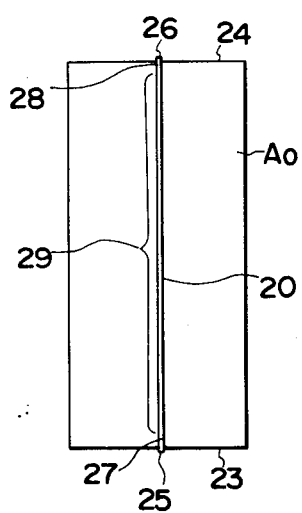
FIG. 2 is a front view of a cylindrical tubular form showing projections extending from the edge parts of the overlapped portion.
Figure 3:
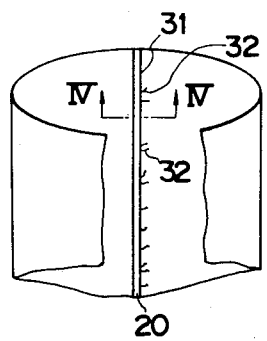
FIG. 3 is a partially broken oblique view of a cylindrical tubular form showing burrs formed on the inner face of the overlapped portion.
Figure 4:
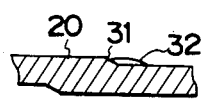
FIG. 4 is a perspective sectional view along the line IV—IV in FIG. 3.
Figure 5:
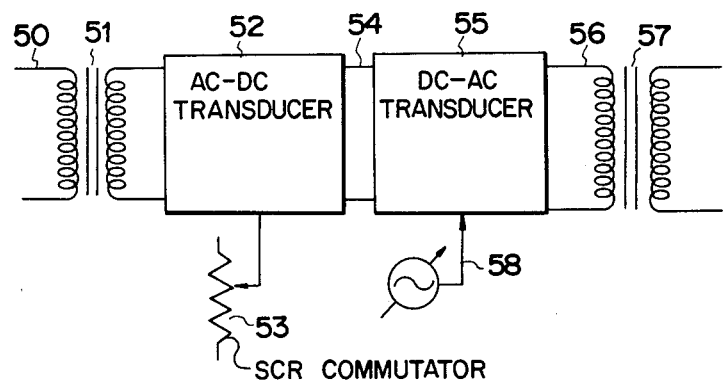
FIG. 5 is a circuit diagram of an electrical voltage conversion system used in the examples of the method of the present invention.

Chrome-treated steel plate having a thickness of 0.21 mm was employed as the material for preparing cylindrical tubular forms which are used to manufacture can bodies. Relating to the current supplied to the portions to be welded (see FIG. 5) a current (60 cycles, 220 V) from a single-phase AC power source 50 is led, via a primary transformer 51, to a transducer 52 which converts AC to DC where first the voltage curve is adjusted in the firing angles and is converted to a line by being passed through a silicon-controlled commutator 53, and then the current is passed through a low-pass filter (not shown) to flatten the output voltage, the current 54 having this flat output voltage is led to a DC-AC transducer 55 to pass the current through a thyristor switch to convert the DC to AC, and further the frequency is changed with a frequency-changing generator 58. The resulting primary current 56 from the DC-AC transducer was supplied to the portions to be welded via a secondary transformer 57.

Figures 6A, 6B, 6C, 6D:
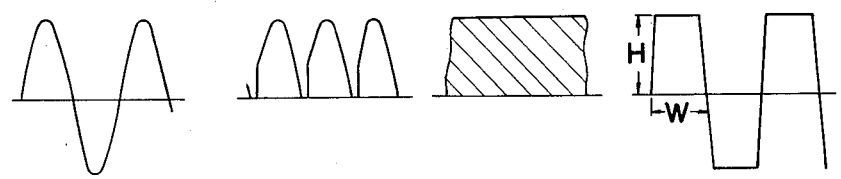
FIGS. 6A, 6B, 6C and 6D are views of the wavy patterns of electrical voltage observed at various parts of the circuit shown in FIG. 5, respectively.

The respective voltage curves mentioned above are shown in FIG. 6. FIG. 6A shows the wave pattern of the voltage of the single-phase AC power voltage; FIG. 6B shows the voltage curve of the DC after the adjustment of the firing angles; FIG. 6C shows the flattened voltage curve; and FIG. 6D shows the voltage curve after the DC was converted to AC by the use of the thyristor switch.

The cycle of the supply primary current was set at 600 Hz, and the welding pressure and the welding speed were set at 35.5 kg/cm$^2$ and 49 m/min., respectively. An average current of 48.25 A (within the range 48.0–48.5 A) was supplied to each of the edge parts (about 2 mm, respectively) of the overlapped portion of the cylindrical tubular form from the primary current 56, while the average current supplied to the center part of the overlapped portion except for the edge parts was 47.05 A (within the range 46.8–47.3 A). Here, these values of the primary current are effective values during the welding. That is, in the present example, the current applied to both edge parts of the overlapped portion was set at a value higher than that applied to the center by 1.2 A in terms of primary current.

The can bodies made of chrome-treated steel plate welded under the above conditions did not suffer from the substantial formation of burrs along their total length, and, in addition, no crack was formed at the edge parts during the formation of flanges. Further, no projection extending from the edges of the overlapped portion was formed.

COMPARISON EXAMPLE 1

The same chrome-treated steel plate as was used in Example 1 given above was employed as the material. The conditions for the frequency of the supply current, welding pressure, welding speed and so on were the same as in Example 1. The welding was performed by applying a supply current of 48.25 A on the average in terms of the on-load effective value of primary current to the cylindrical tubular form along its total length. All of the can bodies produced by the welding performed in accordance with this comparison example had many burrs extending from the overlapped portions on their inner faces, but no crack was observed in either of the edge parts during the formation of flanges. In the case of can bodies produced by welding under the same conditions as the above except that the average supply primary current was changed to 47.05 A, no substantial formation of burrs was observed, but some of the can bodies produced had crack in the edge parts during the formation of flanges. That is, the foregoing means that products of good quality were provided by welding with a current within a narrower range of the current range 46.8–47.3 A. But, as mentioned above, it is not practical to control the range of fluctuation of the current within such a narrow range as 0.1–0.2 A.

The overlapped portions of the can bodies produced by the welding method described in Example 1 given above and of those produced by the welding method as in Comparison Example 1 were cut longitudinally to check the weld. As a result, it was recognized that in the case of the products of Example 1, nuggets at both edge parts (the parts which were melted by electric resistance heating, cooled and solidified) appeared to be large, the gap between them was narrow and the weld strength determined by a tensile breakage test was high as compared with the case of products of Comparison Example 1.

EXAMPLE 2

Steel plate with extremely thin nickel plating applied thereto and further chrome-treatment applied on the plating (hereunder referred to as nickel-chrome-treated steel plate) was employed as the material used for producing can bodies in this second example. This material was formed into cylindrical tubular forms, and under the conditions that the frequency of the supply current was 350 Hz, the welding pressure was 30 kg/cm$^2$, and the welding speed was 35 m/min., the supply current was applied to both of the edge parts of the overlapped portion in an average amount of 60.35 A (within the range 60.0–60.7 A), and to the center in an average amount of 59.1 A (within the range 58.7–59.5 A), each in terms of primary current, to effect the welding. All of the resulting can bodies suffered little from formation of burrs, that is, substantially no burr was formed, and further there was no can body which had a crack. In addition, no projection extending from either of the edge parts of the overlapped portion was found.

COMPARISON EXAMPLE 2

The same nickel-chrome-treated steel plate as was used in Example 2 given above was used as the material. The conditions for the frequency of the supply current, the welding pressure and the welding speed, etc. were the same as in Example 2. The welding was made by applying the supply current of 60.35 A on the average in terms of primary current to the total length of the overlapped portion of the cylindrical tubular forms. All of the can bodies produced by the welding method in this comparison example had many burrs. But, no crack was observed in either of the edge parts during the formation of flanges.

The can bodies produced by the welding under the same conditions as the above except that the average supply primary current was changed to 59.1 A did not have burrs, but some of them had cracks at both of the edge parts during the formation of flanges.

As is apparent from the results of Examples 1 and 2 of the present invention given above, the method of the present invention differs from the prior art welding method for welding the overlapped portions of tubular forms made of thin steel plate, and is characterized in that a larger current is applied to both of the edge parts of the overlapped portion than to the center part of it, thereby simultaneously solving the problems which cannot be solved according to the prior art—the prevention of the formation of burrs and the prevention of the development of cracks—using current within a practically utilizable range of fluctuation. Further, the adoption of the voltage conversion system explained above with reference to FIG. 5 contributes much to put our method to practical use.

The welding method of the present invention may be applied not only to the steel which was used in the examples given above, but also to any type steel for producing can bodies which raises the above-mentioned problems relating to burrs and cracks. Accordingly, the application of the method of the present invention is not limited to tubular forms made of chrome-treated steel plate, and it may be applied to all types of tubular forms made of steel which may cause the formation of burrs. Of course, its application to tubular forms made of tin-plate is not excluded.

In addition, the length of each of the edge parts welded by the larger current was set at 2 mm in the above examples. But, it is not necessary to always employ this length, and it may be longer provided that the problems relating to the cracks and the burrs do not become a bar to the practice of the method of the present invention.

Further, though current of the same value was applied to both of the edge parts of the overlapped portion, there are some cases where better results of welding are provided by applying current of different values to the two edge parts as for example if the width of the overlapped portion differs at the two edge parts. Additionally, though it is necessary to have a period during which the rear end of a preceding tubular form and the front end of a following tubular form are in the welding zone at the same time in order to prevent the formation of projections, it is not a requirement of the present invention to leave a space between the rear end and the front end, and the two ends may be in contact with each other. In carrying out the present invention, the electrodes which may be used for the welding are not limited to wire-electrodes, and they may be roll-electrodes.

The present invention relates to a method which can be said to be completely against the prior art method. According to the method of the present invention, there is no need to employ physical means such as the cutting of the chrome-treated layer, and only a modification of the electric current system is enough to accomplish the purpose. Thus, the present invention is a useful one which enables the actual use of can bodies manufactured by the welding of chrome-treated steel plate, etc.

We claim:

1. A method for electric resistance seam welding of the side overlapped portion of tubular forms made of thin steel plate, the tubular forms having front and rear edge parts and a central part between the front and rear edge parts, the method comprising the steps of:
    a. successively passing the overlapped portion of each of the tubular forms between welding electrodes such that before the overlapped portion of a preceding tubular form has passed out from between the welding electrodes, the overlapped portion of a following tubular form is inserted between the welding electrodes; and
    b. applying a current to the welding electrodes so as to successively subject the overlapped portion of each of the tubular forms to electric resistance seam welding while between the welding electrodes;
    c. the step of applying a current including the steps of applying a first welding current having a first magnitude to the welding electrodes while the central part of the tubular forms is between the welding electrodes, such that substantially no burrs are formed along the overlapped portion thereof, and apply a second welding current having a second magnitude greater than the first magnitude to the welding electrodes while the front and rear edge parts are between the welding electrodes.

2. A method as in claim 1, wherein the tubular forms are cylindrically shaped.

3. A method as in claim 1, wherein the tubular forms have square cross sections.

4. A method as in claim 1, wherein the tubular forms have ellipsoidal cross sections.

5. A method as in claim 1, wherein the thin steel place is chrome-treated steel plate having a thinkness of 0.21 mm, the first current having an average magnitude of 47.05 Amperes, the second current having an average magnitude of 48.25 Amperes.

6. A method as in claim 1, wherein the thin steel plate is nickel-chrome-treated steel plate, the first current having an average magnitude of 49.1 Amperes, the second current having an average magnitude of 60.35 Amperes.

7. A method as in claim 1, wherein the thin steel plate is tin-plate.

* * * * *